(12) United States Patent
Mikuni et al.

(10) Patent No.: US 6,295,071 B1
(45) Date of Patent: Sep. 25, 2001

(54) IMAGE PROCESSING APPARATUS AND OPERATION MODE CHANGING METHOD THEREFOR

(75) Inventors: Makoto Mikuni, Yokohama; Teruyuki Nishii, Kashiwa, both of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/111,734

(22) Filed: Jul. 8, 1998

(30) Foreign Application Priority Data

Jul. 8, 1997 (JP) .................................................... 9-196435

(51) Int. Cl.⁷ .................................................... G06F 15/00
(52) U.S. Cl. .............................................................. 345/433
(58) Field of Search .................................... 345/433, 326, 345/121, 333, 334, 335

(56) References Cited

U.S. PATENT DOCUMENTS 6,078,401 * 6/2000 Kanamori ............................ 358/1.16
6,111,659 * 8/2000 Murata ................................. 358/296

* cited by examiner

*Primary Examiner*—Phu K. Nguyen
(74) *Attorney, Agent, or Firm*—Fitzpatrick, Cella, Harper & Scinto

(57) ABSTRACT

Even if a display unit has a display area on which an amount of information to be displayed at the same time is very small is used, confirmation and the like of the operation mode can be made easily and rapidly. After a read resolution and a read density are initialized, an operation goes to a stand-by state, and when an original is detected, a character string "DOCUMENT READY" is displayed on the display unit. Next, when a resolution key is depressed, a character string "STANDARD" as a default of the read resolution is displayed on the display unit without renewing the operation mode. Next, when the resolution key is again depressed, the operation mode is renewed and a character string "FINE" is displayed on the display unit. If the resolution key is again depressed thereafter, the operation mode is again renewed and a character string "PHOTO" is displayed on the display unit. For a read density and other operation designation inputs, operations similar to the above are performed.

28 Claims, 12 Drawing Sheets

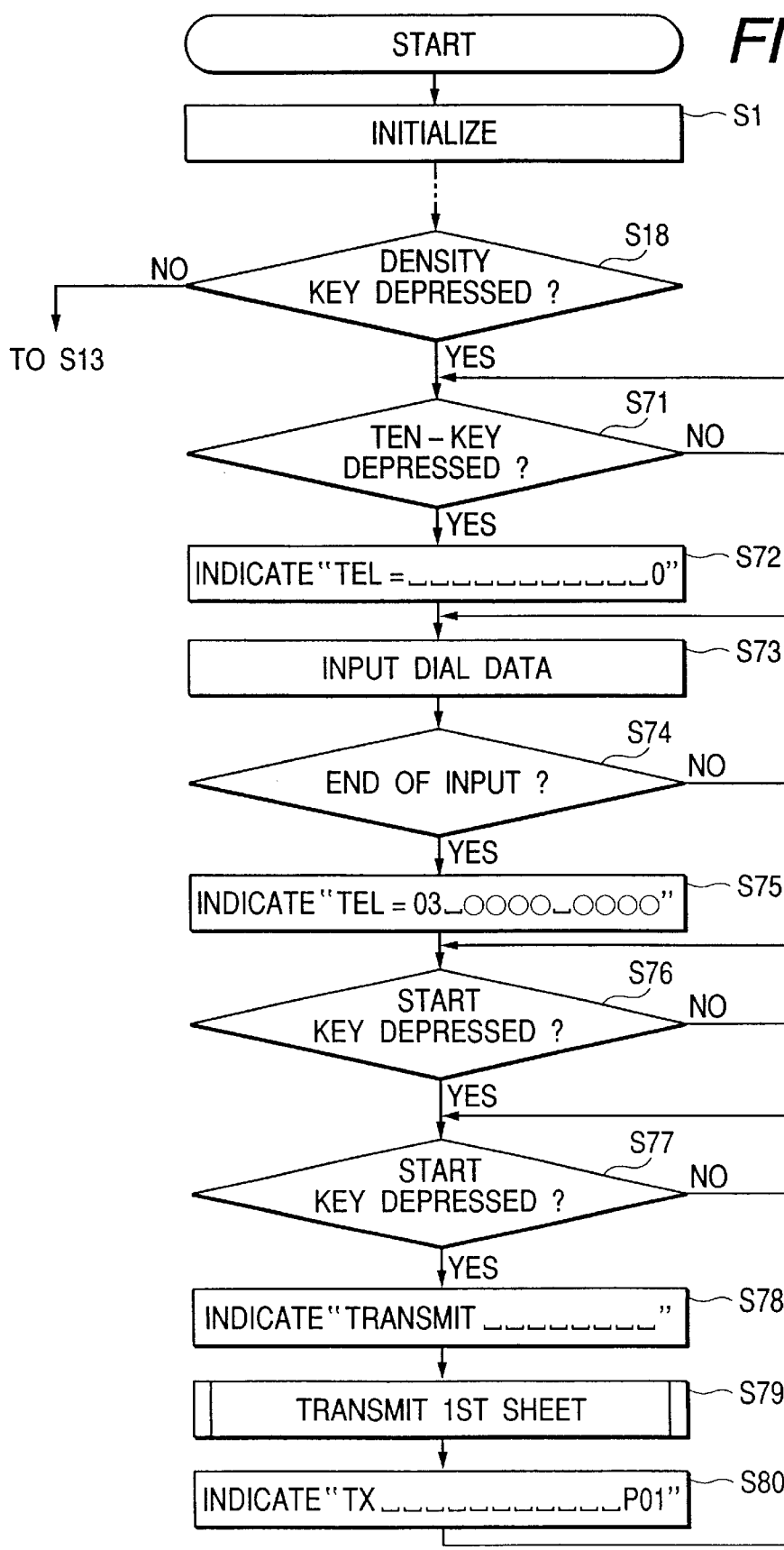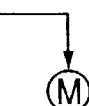
FIG. 10

IMAGE PROCESSING APPARATUS AND OPERATION MODE CHANGING METHOD THEREFOR

BACKGROUND OF THE INVENTION

1. Field of the Invention

The present invention relates to an image processing apparatus and an operation mode changing method for the image processing apparatus. More particularly, the invention relates to an image processing apparatus capable of inputting an operation mode and displaying it and to an operation mode changing method for the image processing apparatus.

2. Related Background Art

In the field of an image processing apparatus such as a facsimile apparatus, an operation mode designated by a user is always displayed on a liquid crystal display (LCD), a light emitting diode (LED) or the like. However, with such a conventional display method, a display unit becomes large and the display contents are complicated.

In order to make apparatuses small and inexpensive, a small display unit having a small display area has been used recently and only when the change of an operation mode is designated by a user, this changed operation mode is displayed, if necessary, on a display unit, while the operation mode previously designated by the user is not displayed as usual. For example, assuming that an image processing apparatus has five operation modes: mode A, mode B, mode C, mode D, and mode E, the apparatus is generally provided with an operation mode changing key for sequentially selecting these operation modes. When a current operation mode is mode A, this mode A does not displayed, as usual, on a display unit, but only when a user depresses the operation mode changing key to change the operation mode from mode A to mode B, "B" representative of mode B is displayed at the same time when the operation mode is changed to mode B.

When the image apparatus starts an operation such as a read operation and a record operation, it is necessary to display the operation state on an LCD or the like. Therefore, the operation state such as a read operation and a record operation is displayed with a priority over the operation mode.

The above-mentioned conventional method, however, causes the following problem. Namely, even if the user wishes to confirm a current operation mode depresses the operation changing key, the operation mode is automatically changed, so that the user is required to depress the key several times to resume the original operation mode. For example, if the operation mode changing key is depressed in order to confirm that the current operation mode is mode A, this key operation changes the operation mode to mode B. Therefore, it is necessary to depress the key four times in order to resume mode A. The apparatus is therefore not easy to use and erroneous operation by the user may occur. This erroneous operation may result in an image output not desired.

The above-mentioned conventional method is associated with another problem. In a case where a plurality of originals are to be read in different operation modes, if the operation mode for the first original is determined and then the read operation starts, the operation state of the image processing apparatus which has recovered the first original is displayed on LCD or the like. In this case, when it is required to change the operation mode such as a resolution of the succeeding originals at the middle of recording the plurality of originals, it is not possible to change the operation mode together with confirming the display contents on the display unit. Therefore, erroneous setting of the operation mode may occur and the image processing may proceed under the erroneous operation mode setting.

SUMMARY OF THE INVENTION

The present invention has been made to solve the above problems. It is an object of the present invention to provide an image processing apparatus and an operation mode changing method therefor, which enables reliable and easy confirmation, designation, changing and the like of the operation mode even if there is prepared a display area on which an amount of information displaceable at the same time is very small.

BRIEF DESCRIPTION OF THE DRAWINGS

FIG. 10 is a first flow chart illustrating the processes of a third embdoiment of an operation mode changing method for an image processing apparatus according to the invention.

DETAILED DESCRIPTION OF THE PREFERRED EMBODIMENTS

Embodiments of the invention will be described in detail with reference to the accompanying drawings.

Figure 1:
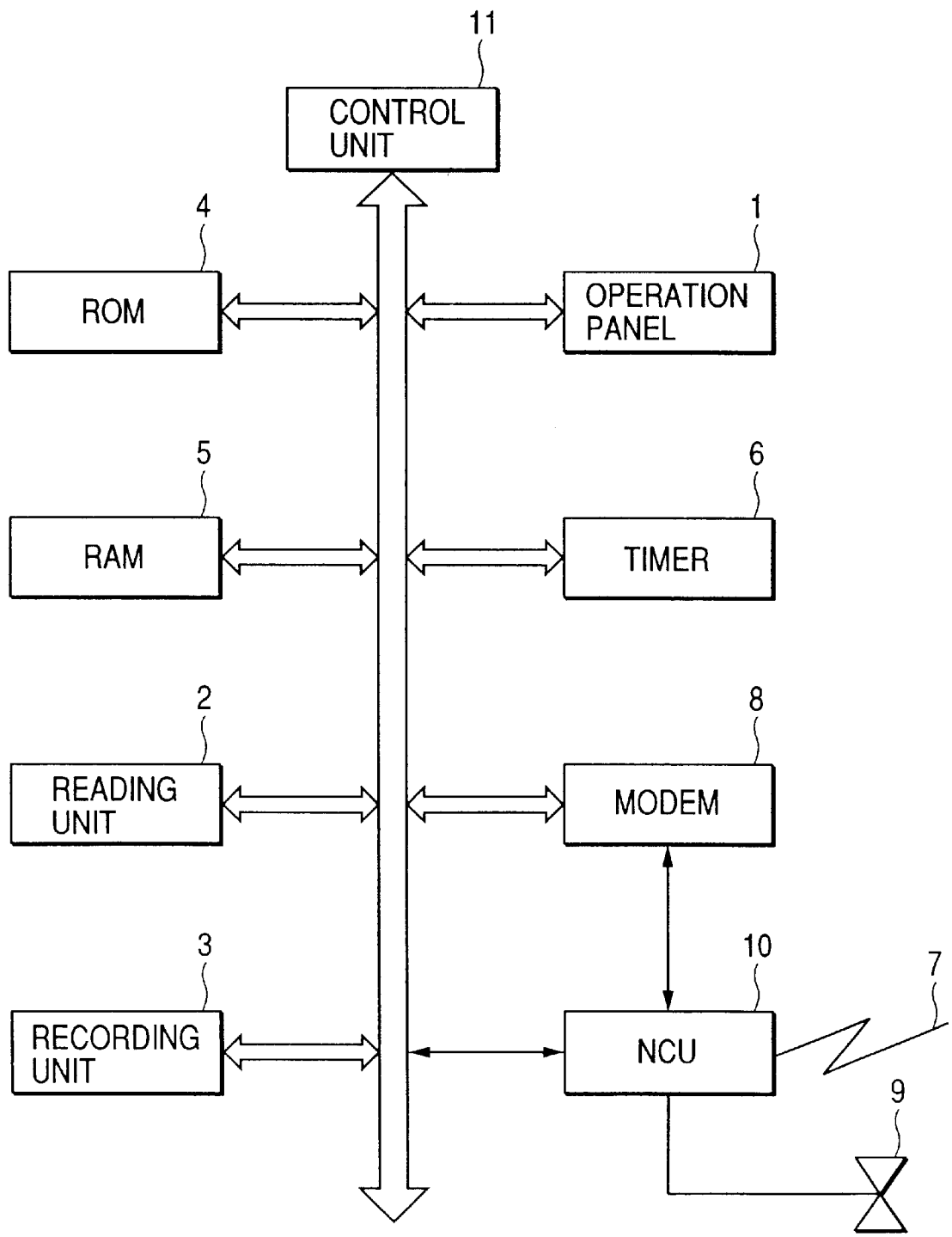
FIG. 1 is a block diagram showing the structure of a facsimile apparatus as an embodiment of an image processing apparatus according to the invention.

FIG. 1 is a block diagram showing the structure of a facsimile apparatus as an embodiment of an image processing apparatus according to the invention. The facsimile apparatus has: an operation panel 1 for entering desired information or the like; a reading unit 2 including an image sensor such as a contact sensor, an image processing circuit and the like; a recording unit 3 including an ink jet printer, a laser beam printer or the like for outputting a hard copy of image data: a ROM 4 for storing predetermined control programs, operator messages, character codes and the like; a RAM 5 including a volatile memory unit and a non-volatile memory unit; a timer 6 capable of counting a time in the unit of 1 ms; a modem 8 for modulating transmission image data stored in RAM 5 and digital signals to output the modulated data to a telephone line 7 and for demodulating signals from the telephone line 7 into reception image data and digital signals; a network control unit (NCU) 10 including relays, transformers, photocouplers and the like for selectively connecting the telephone line either to the modem 8 or a telephone 9; and a control unit 11 connected to the above components and including a microprocessor and the like for executing the control programs stored in ROM 4 to control the entirety of the apparatus.

The volatile memory unit of RAM 5 is used for a work area of the control unit 11 and for temporarily storing image data, whereas the non-volatile memory unit thereof is used for storing data necessary for the operation of the apparatus, data registered by users, and if necessary, image data and the like. In this embodiment, the timer 6 outputs an interrupt signal to the control unit 11 upon counting a predetermined time.

Figure 2:
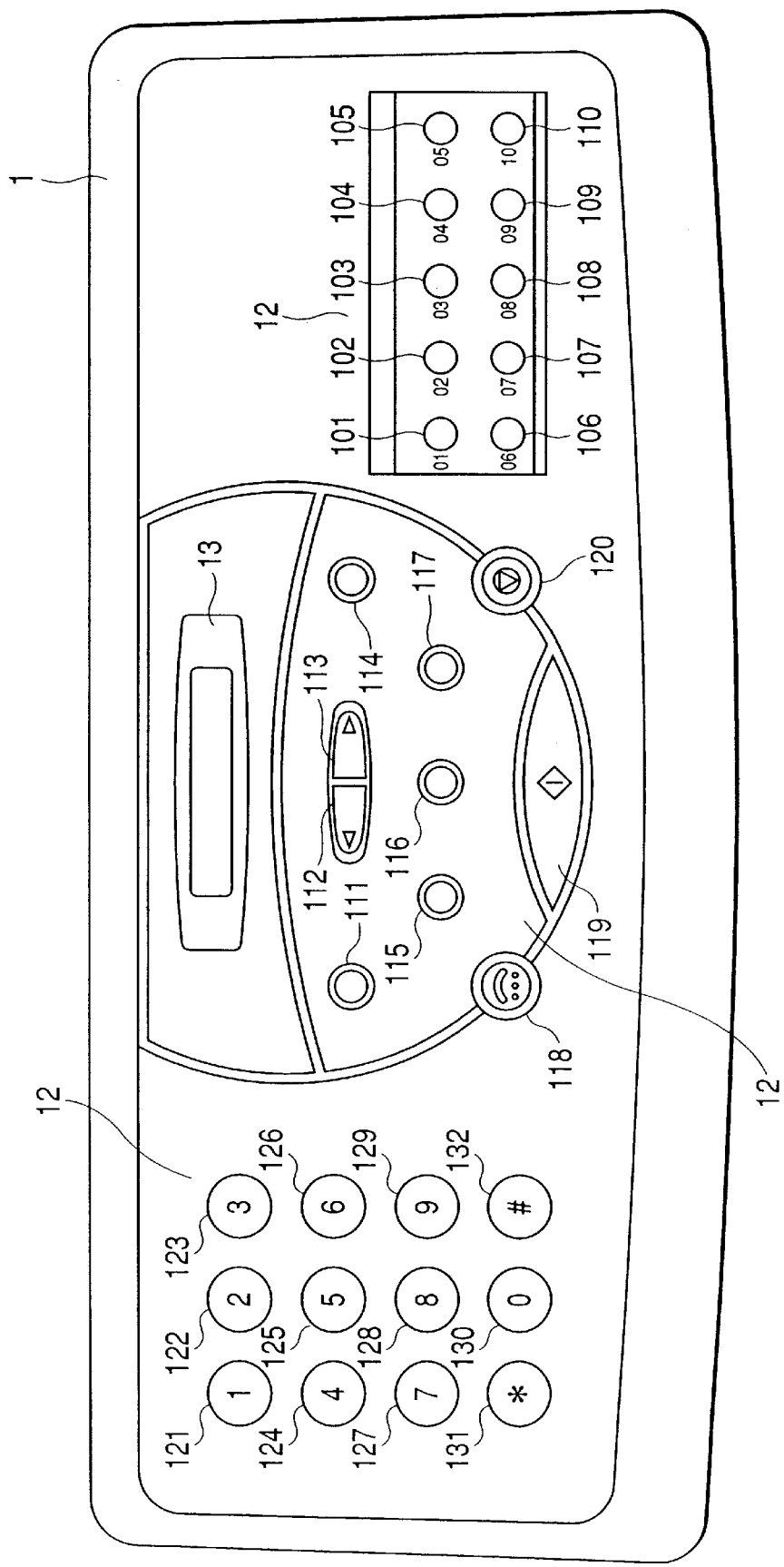
FIG. 2 is a plan view of an operation panel.

FIG. 2 is a plan view of the operation panel 1. The operation panel 1 has a key input unit 12 having 32 keys for entering predetermined information and a display unit 13 made of a dot matrix LCD capable of displaying 16 columns of 5×7 dots in one row.

The key input unit 12 has: one-touch keys 101 to 110; a reception mode key 111 for changing between four reception modes of telephone-facsimile changing/manual-reception/automatic-answering-machine-connection/facsimile-only modes; volume keys 112 and 113 for controlling the volume of a speaker; a resolution key 114 for switching between three read resolutions of standard/fine/photograph; a short-cut (or abbreviation) key 115 for activating short-cut dialing; a function key 116 for activating various settings and registrations; a density key 117 for changing between three densities of dark/normal/light; an off-hook key 118 for capturing the telephone line 7 to prepare dialing without actually operating the telephone 9; a start key 119 for activating various operations; a stop key 120 for stopping the operation, setting, and registration; and ten-keys 121 to 132 for performing the operation similar to dialing of the telephone 9. Ten telephone numbers at a maximum, which are given identification numbers of 01 to 10, can be registered in RAM 5 in correspondence with the one-touch keys 101 to 110. When one of these one-touch keys 101 to 110 is depressed, the corresponding telephone number is read from RAM 5.

FIGS. 3 to 7 are flow charts illustrating the first embodiment of the operation mode changing method according to the invention. In the first embodiment, the processes of changing a read resolution and a read density will be described.

Figure 3:
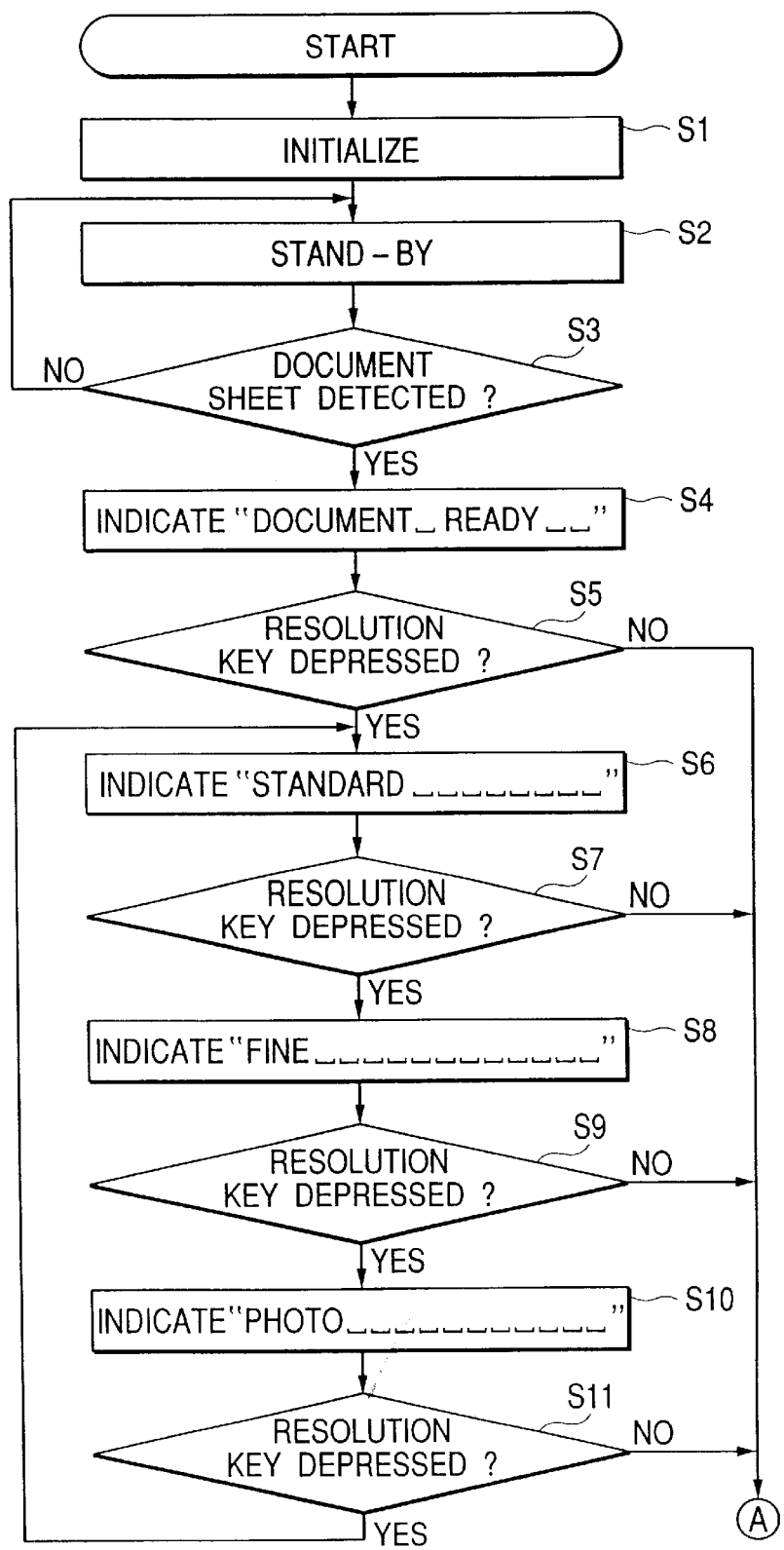
FIG. 3 is a first flow chart illustrating the processes of a first embodiment of an operation mode changing method for an image processing apparatus according to the invention.

Referring to FIG. 3, at Step S1 a read resolution and a read density are initialized to set the read resolution to a standard mode and the read density to a normal mode.

The read resolution includes three resolutions of standard/fine/photograph, as described earlier. The standard (STANDARD) mode corresponds to 200 dpi×100 dpi, and the fine (FINE) mode corresponds to 200 dpi×200 dpi. The photograph (PHOTO) mode is used when a half tone image such as a photograph is processed. The read density includes three modes, i.e. a dark mode, a normal mode, and a light mode as before-mentioned.

After the initialization process is completed at Step S1, the operation enters a stand-by state (Step S2) to display current date and time on the display unit 13. At Step S3 it is checked whether sensor (not shown) of the reading unit 3 has detected an original. When an original is set on the reading unit 3 and detected with the sensor, a character string "DOCUMENT READY" indicating the detection of an original is displayed on the display unit (Step S4).

Next, at Step S5 it is checked whether the resolution key 114 has been depressed. If depressed, the standard mode as the default of the read resolution is selected without renewing the contents of RAM 5, and a character string "STANDARD" is displayed on the display unit 13 (Step S6). Next, at Step S7 it is checked whether the resolution key 114 has been depressed again. If depressed (Yes), it is judged that the image resolution is required to be set to a higher resolution, and the contents of RAM 5 are renewed and a character string "FINE" is displayed on the display unit 13 (Step S8). Next, at Step S9 it is checked whether the resolution key 114 has been depressed again. If depressed (Yes), it is judged that a photograph original is read, and the contents of RAM 5 are renewed and a character string "PHOTO" is displayed on the display unit 13 (Step S11). Next, at Step S11 it is checked whether the resolution key 114 has been depressed again. If depressed (Yes), the operation returns to Step S6 to repeat the above processes. In the above manner, a desired resolution is selected.

Figure 4:
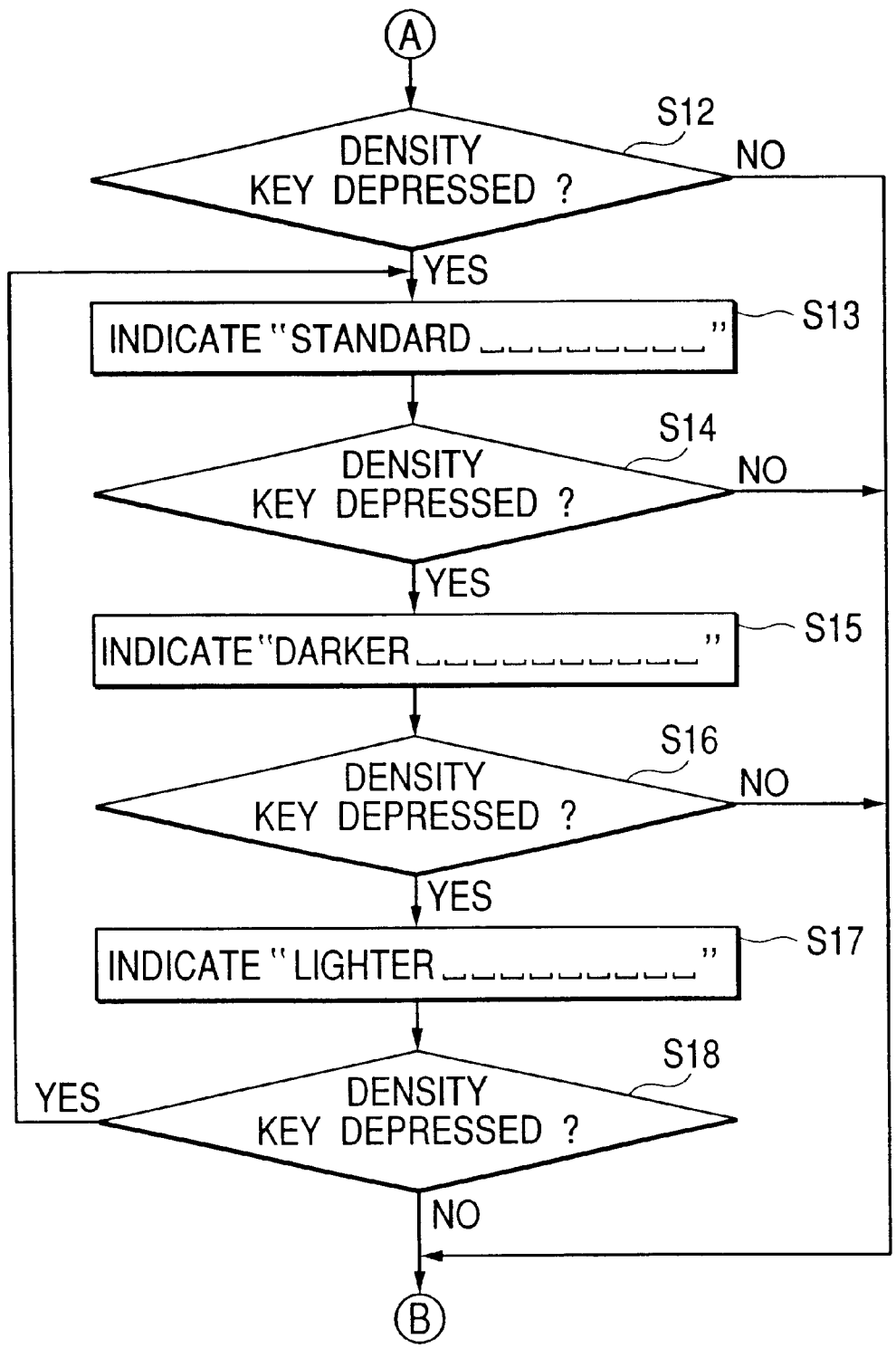
FIG. 4 is a second flow chart illustrating the processes of the first embodiment of an operation mode changing method for an image processing apparatus of the invention.

If the judgement result at Step S5, S7, S9, or S11 is negated (No) because a desired resolution has been selected, the operation advances to Step S12 shown in FIG. 4 whereat it is checked whether the density key 117 has been depressed. If depressed (Yes), the standard mode as the default of the read density is selected without renewing the contents of RAM 5, and the displayed resolution is erased and the character string "STANDARD" is displayed on the display unit 13 (Step S13). Next, at Step S14 it is checked whether the density key 117 has been depressed again. If depressed (Yes), the contents of RAM 5 are renewed to set the read density darker and a character string "DARKER" indicating a dark mode is displayed on the display unit 13 (Step S15). Next, at Step S16 it is checked whether the density key 117 has been depressed again. If depressed (Yes), the contents of RAM 5 are renewed to set the density lighter and a character string "LIGHTER" indicating a light mode is displayed on the display unit 13 (Step S17). Next, at Step S18 it is checked whether the density key 117 has been depressed again. If depressed (Yes), the operation returns to Step S13 to repeat the above processes. In the above manner, a desired read density is selected.

Figure 5:
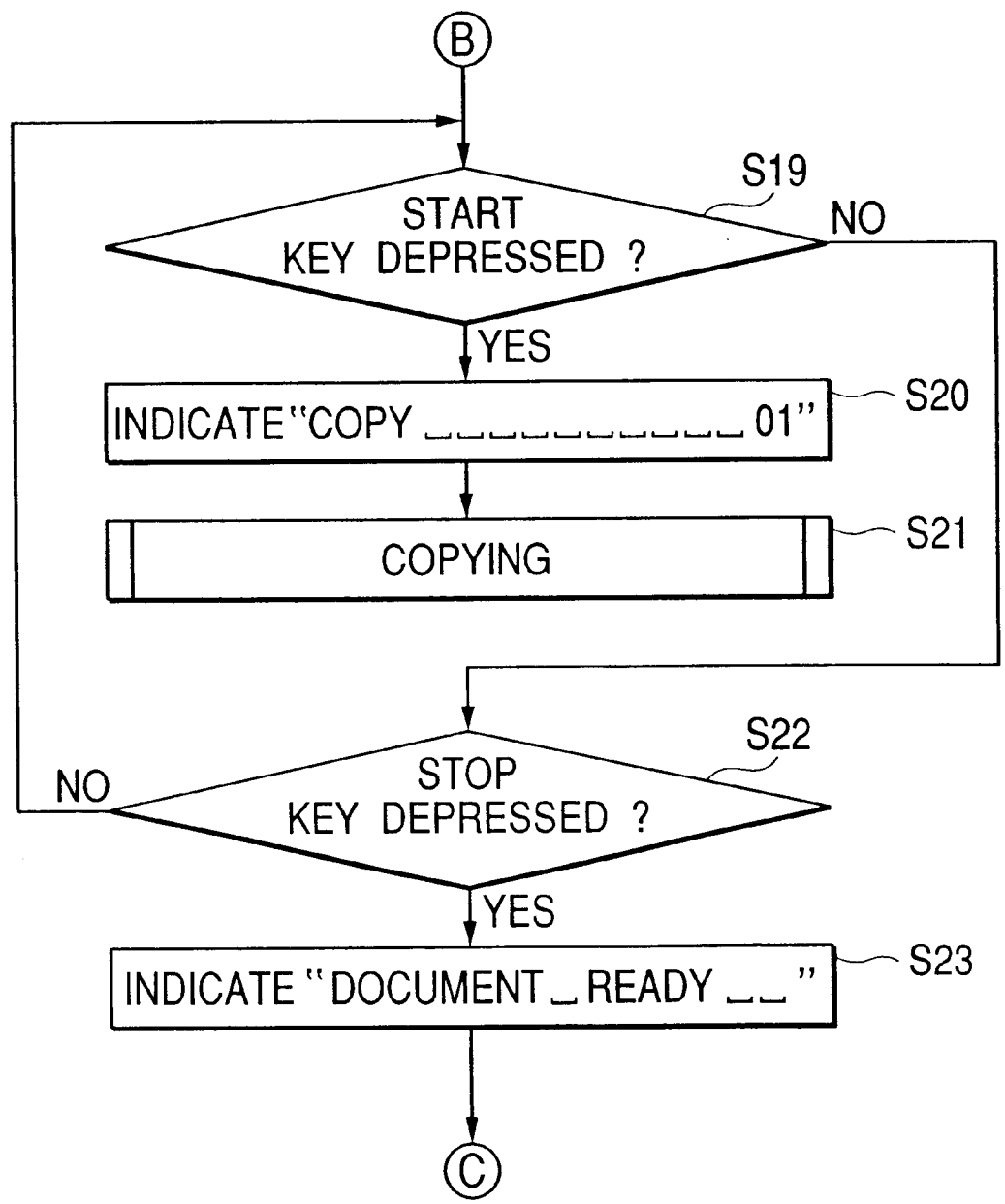
FIG. 5 is a third flow chart illustrating the processes of the first embodiment of an operation mode changing method for an image processing apparatus of the invention.

If the judgement result at Step S12, S14, S16, or S18 is negated (No) because a desired read density has been selected, the operation advances to Step S19 shown in FIG. 5 whereat it is checked whether the start key 119 has been depressed. If depressed (Yes), a character string "COPY 01" is displayed on the display unit 13 (Step S20) and the apparatus is made ready for copying. The number of copies is entered by using the ten-keys 121 to 132 and the start key 119 is again depressed to execute a predetermined copy operation (Step S21).

If the start key 119 is not depressed at Step S19, the operation advances to Step S22 whereat it is checked whether the stop key 120 has been depressed. If not depressed, the operation returns to Step S19, whereas if depressed, a character string "DOCUMENT READY" is displayed on the display unit 13 (Step S29) to the thereafter advance to Step S24 shown in FIG. 6.

The operations after Step S24 become different depending upon the number of times of depressions and the depression timing respectively of the resolution key 114 and density key 117 effected in the processes shown in FIGS. 3 and 4. Specifically, at Step S24 it is checked whether the resolution key 114 has been depressed again. If depressed, the resolution mode stored in RAM 5 is retained (Step S25), and at Step S26 a current resolution mode is confirmed. If the read resolution is the standard mode, the character string "STANDARD" is displayed on the display unit 13 (Step S27).

Next, if the resolution key 114 is again depressed at Step S28 and the contents of RAM 5 are renewed to the fine mode or if the judgement result at Step S26 indicates the fine mode, then the character string "FINE" is displayed on the display unit 13 (Step S29).

Next, if the resolution key 114 is again depressed at Step S30 and the contents of RAM 5 are renewed to the photograph mode or if the judgement result at Step S26 indicates the photograph mode, then the character string "PHOTO" is displayed on the display unit 13 (Step S31).

Thereafter, at Step S32 it is checked whether the resolution key 114 has been depressed again. If depressed (Yes), the operation returns to Step S27 to repeat the above processes.

Figure 7:
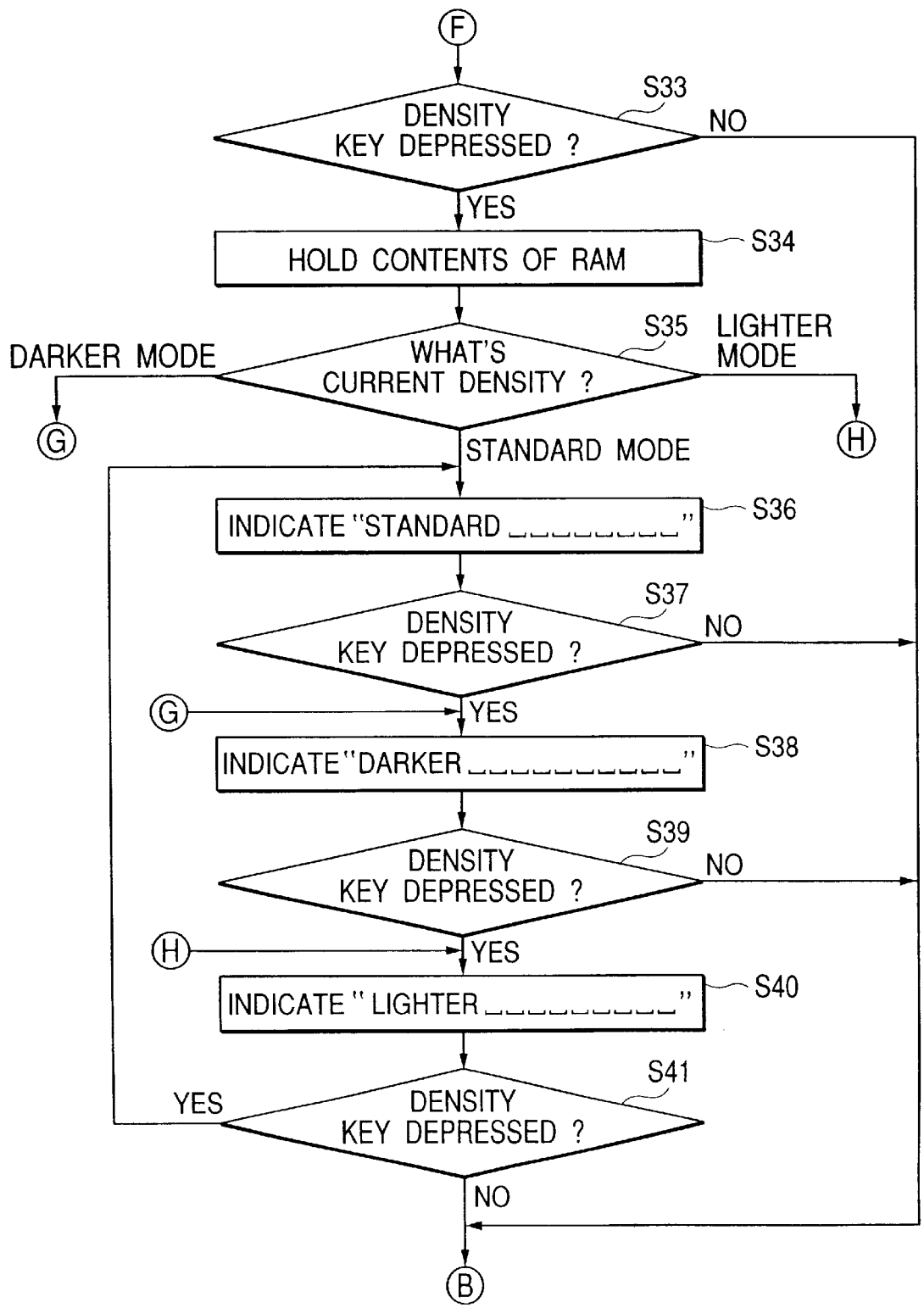
FIG. 7 is a fifth flow chart illustrating the processes of the first embodiment of an operation mode changing method for an image processing apparatus of the invention.

If the judgement result at Step S28, S30, or S32 is negated (No) because a desired resolution has been selected, the operation advances to Step S33 shown in FIG. 7 whereat it is checked whether the density key 117 has been depressed. If depressed, the read density mode stored in RAM 5 is retained (Step S34), and at Step S35 a current density is confirmed. If the read density is the standard mode, the character string "STANDARD" is displayed on the display unit 13 (Step S36).

Next, if the density key 117 is again depressed at Step S37 and the contents of RAM 5 are renewed to the dark mode or if the judgement result at Step S35 indicates the dark mode, then the character string "DARKER" is displayed on the display unit 13 (Step S39).

Next, if the density key 117 is again depressed at Step S39 and the contents of RAM 5 are renewed to the light mode or if the judgement result at Step S35 indicates the light mode, then the character string "LIGHTER" is displayed on the display unit 13 (Step S40).

Thereafter, at Step S41 it is checked whether the density key 117 has been depressed again. If depressed (Yes), the operation returns to Step S36 to repeat the above processes, whereas if negated (No), the operation returns to Step S19 of FIG. 5 to repeat the above-described processes.

In this embodiment described above, when the resolution key 114 or density key 117 is depressed at the first time, the resolution or read density is not renewed but the resolution or read density immediately before the depression is retained. It is therefore possible to easily and rapidly perform the current mode. Still further, since the operation mode is sequentially changed at the second and following depressions of the resolution key 114 or density key 117, the operation mode can be easily and reliably changed.

Figure 6:
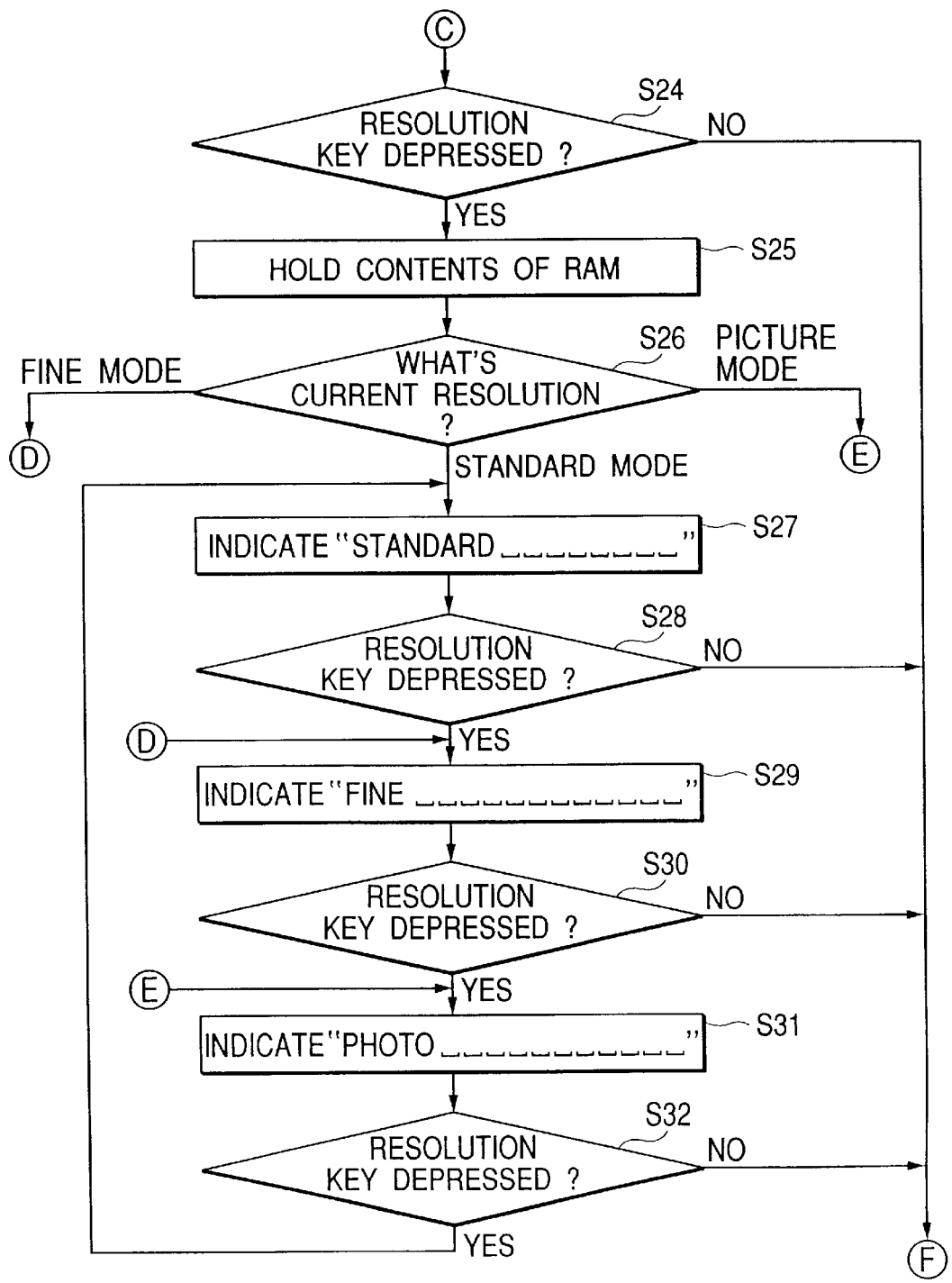
FIG. 6 is a fourth flow chart illustrating the processes of the first embodiment of an operation mode changing method for an image processing apparatus of the invention.

In this embodiment, after the copy operation is completed at Step S21 shown in FIG. 5, the operation returns to Step S2 of FIG. 3 or the operation advances to Step S24 of FIG. 6 by displaying the character string "DOCUMENT READY" if the current operation mode is retained and an original is detected.

Figure 8:
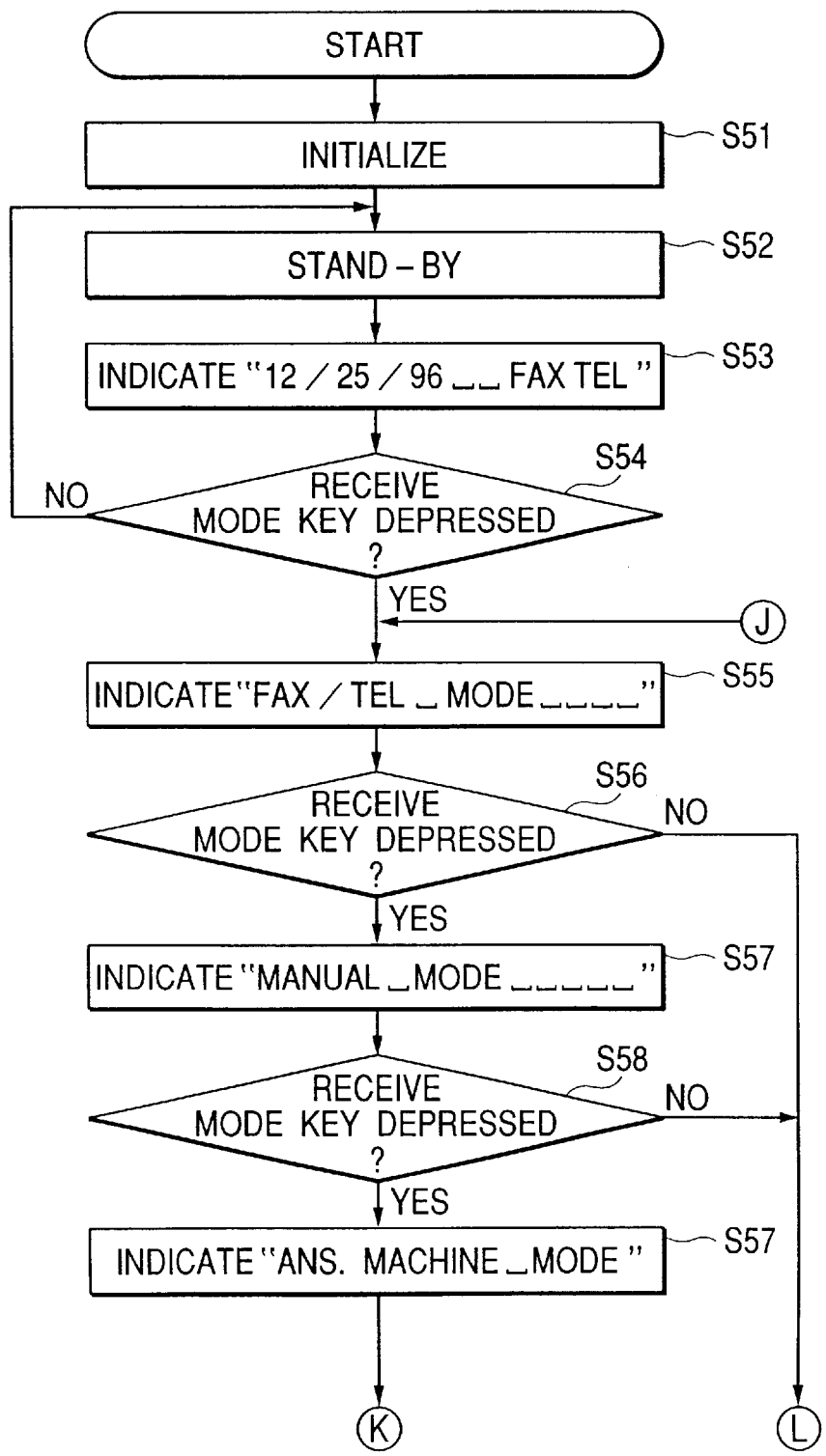
FIG. 8 is a first flow chart illustrating the processes of a second embodiment of an operation mode changing method for an image processing apparatus according to the invention.
Figure 9:
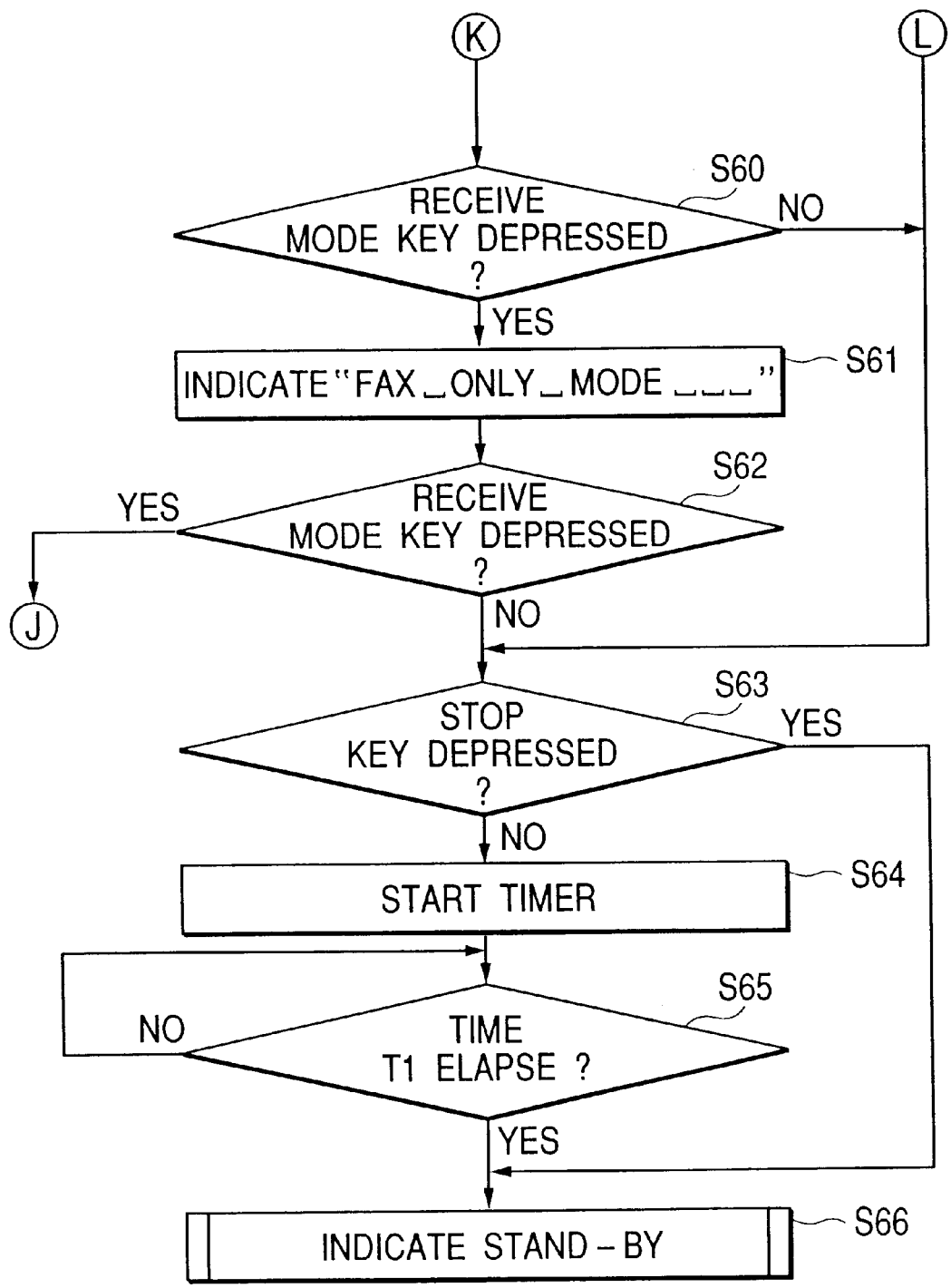
FIG. 9 is a second flow chart illustrating the processes of the second embodiment of an operation mode changing method for an image processing apparatus of the invention.

FIGS. 8 and 9 are flow charts illustrating the processes of the second embodiment of the operation mode changing method according to the invention. In the second embodiment of the operation mode changing method, changing between the reception modes will be described.

Referring to FIG. 8, at Step S51 the reception mode is initialized to the telephone-facsimile changing mode.

As described earlier, the reception mode includes four reception modes of telephone-facsimile changing/manual-reception/automatic-answering-machine-connection/facsimile-only modes. In the telephone-facsimile changing mode, a facsimile signal is monitored for a predetermined time for facsimile reception, and if an effective signal is not received, the telephone line is switched to the telephone 9. In the manual reception mode, reception by the telephone 9 is used usually, and facsimile reception is used when necessary. In the automatic answering machine connection mode, if there is a reception while the telephone 9 is used as the automatic answering machine connection, a facsimile signal is monitored under the condition that the telephone line 7 is connected to the telephone 9, and when an effective signal is received, the telephone line 7 is switched to the modem 8 to perform facsimile reception. In the facsimile-only mode, only facsimile reception is performed.

After the initialization process is completed at Step S51, the operation enters a stand-by state (Step S52) to display current date and time and an abbreviation of a current reception mode on the display unit 13 (Step S53). Namely, since the default of the reception mode is the telephone-facsimile switching mode, its abbreviation "FaxTel" is displayed on the display unit 13 together with the current date and time.

Next, at Step S54 it is checked whether the reception mode key 111 has been depressed. If depressed, the telephone-facsimile switching mode is retained without renewing the contents of RAM 5, and a character string "Fax/Tel Mode" is displayed on the display unit 13 (Step S55). Next, the operation advances to Step S56 where it is checked whether the reception mode key 111 has been depressed again. If depressed (Yes), it is judged that the depression of the reception mode key 111 is intended to change to the manual mode, and the contents of RAM 5 are renewed and a character string "Manual Mode" is displayed on the display unit 13 (Step S57). Next, at Step S58 it is checked whether the reception mode key 111 has been depressed again. If depressed (Yes), the contents of RAM 5 are renewed to change the reception mode to the automatic answering machine connection mode and a character string "Ans. Machine Mode" is displayed on the display unit 13 to thereafter follow Step S60 in FIG. 9.

At Step S60 it is checked whether the reception mode key 111 has been depressed again. If depressed (Yes), the contents of RAM 5 are renewed to change the reception mode to the facsimile-only mode and a character train "Fax Only Mode" is displayed on the display unit 13.

Next, at Step S62 it is checked whether the reception mode key 111 has been depressed again. If depressed (Yes), the operation returns to Step S55 (FIG. 8) to repeat the above-described processes.

If the judgement result at Step S56, S58, S60 or S62 is negated (No), the operation advances to Step S63 whereat it is checked whether the stop key 120 has been depressed. If not depressed, the timer 6 is set to a predetermined time T1 (e.g., one minute) at Step S64. After the predetermined time T1 has lapsed, a stand-by state is automatically displayed at Step S66.

Similar to the first embodiment, even if the operation mode is the reception mode, a current operation mode can be easily and rapidly confirmed, and the operation mode can be changed easily and reliably.

Although not shown in the flow chart, if the reception mode key 111 is depressed again before the predetermined time T1 lapses, it is assumed that the reception mode key 111 was depressed at Step S55, Step S57, Step S59, or Step S61 in accordance with the display contents, and the above-described processes are repeated. For example, if the reception mode key 111 is depressed under the display state at Step S59 while the timer operates at Step S65, it is assumed that the reception mode key 111 was depressed at Step S60, and the display at Step S61 is performed.

Next, the third embodiment will be described in which a plurality of originals are placed on the reading unit 2 and collectively transmitted to a destination terminal.

Figure 11:
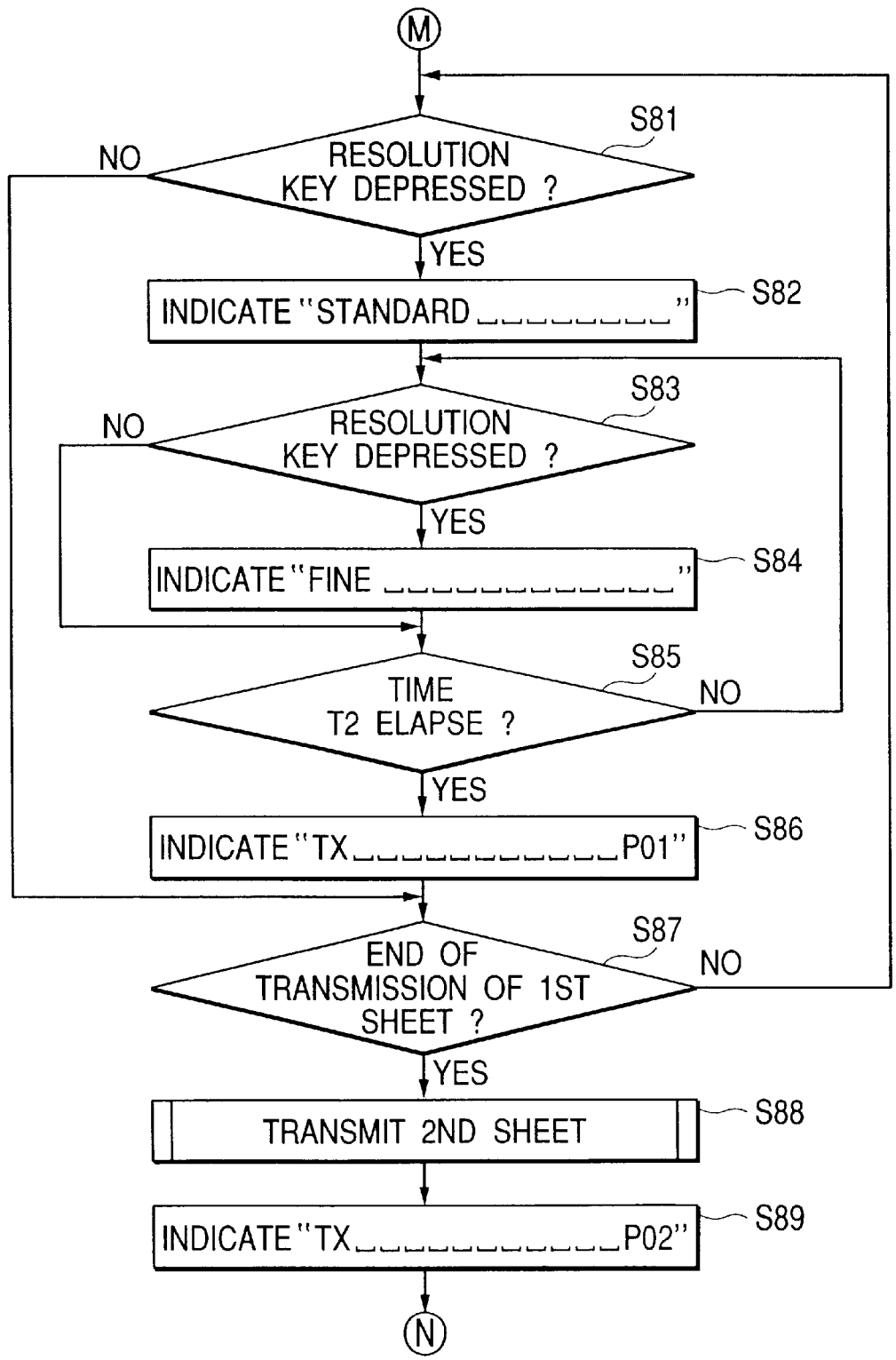
FIG. 11 is a second flow chart illustrating the processes of the third embodiment of an operation mode changing method for an image processing apparatus of the invention.
Figure 12:
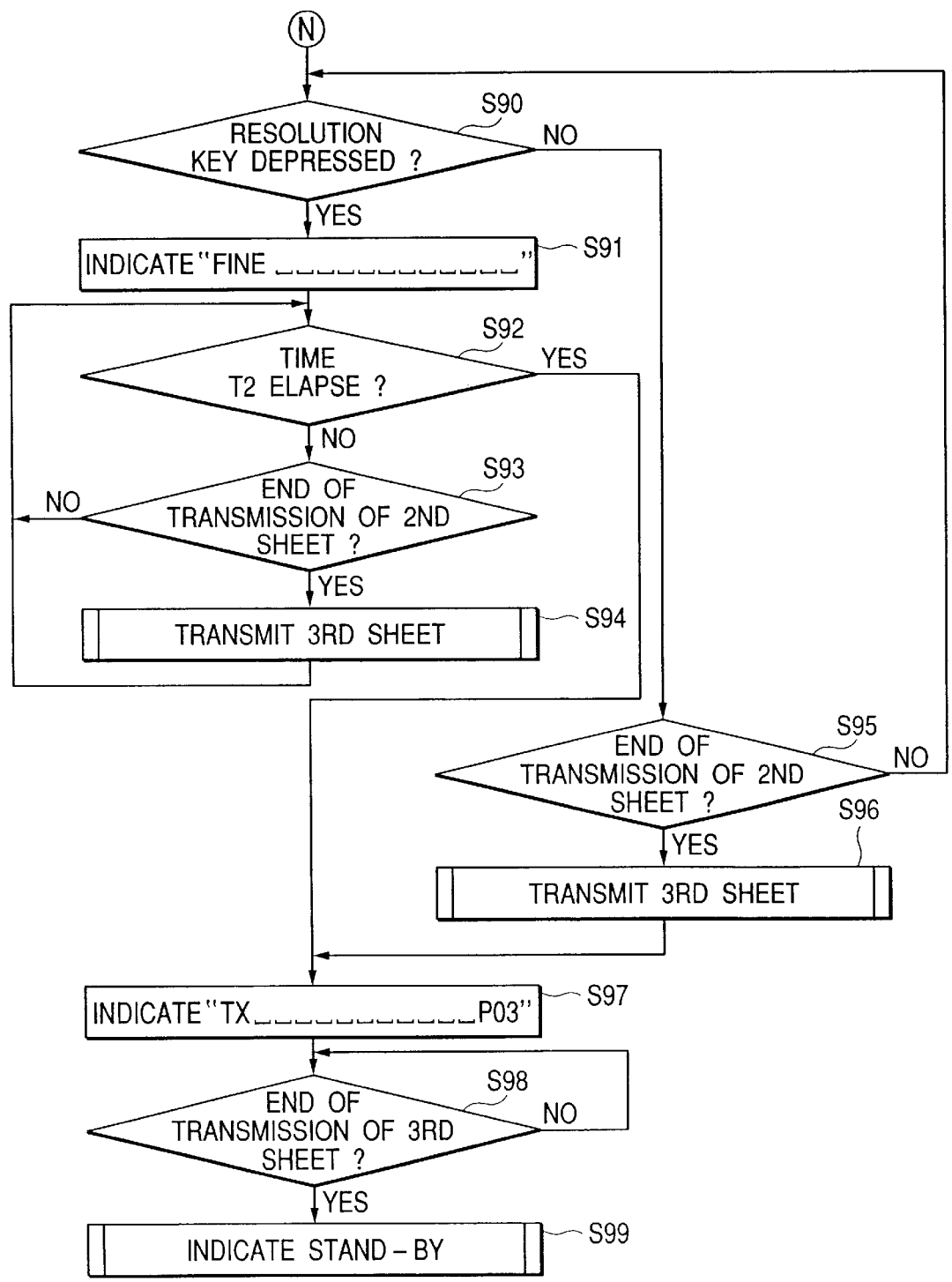
FIG. 12 is a third flow chart illustrating the processes of the third embodiment of an operation mode changing method for an image processing apparatus of the invention.

FIGS. 10 to 12 are flow charts illustrating main processes of the third embodiment. In the third embodiment, the operation mode changing processes will be described assuming that three originals are placed on the reading unit and collectively transmitted.

Referring to FIG. 10, similar to the first embodiment, the processes at Steps S1 to S18 are performed to set desired resolution and read density of the first original. Next, it is checked whether a first digit number of the dial information of a communication partner has been entered from any one of the ten-keys 121 to 132 (Step S71). If not entered (No), the operation goes to a stand-by state for the input of the dial information of the communication partner (destination terminal), whereas if entered, the entered number is displayed on the display unit 13. For example, if the first digit of the dial information is "0", the ten-key 130 corresponding to the number "0" is depressed and a character string "TEL=0" is displayed on the display unit 13 (Step S72). One of the ten-keys 121 to 132 is again depressed to enter the dial information (Step S73), and it is checked whether the dial information is input completely (Step S74). In this manner, desired ones of the ten-keys 121 to 132 are sequentially depressed to enter the dial information of the communication partner. After the dial information is input completely, the dial information of the communication partner, e.g., "TEL=03 ** **", is displayed on the display unit 13 (Step S75).

Next, it is checked whether the start key 119 has been depressed (Step S76). If depressed, the dial information is established at this time. It is checked whether the start key 119 has been depressed again (Step S77). If depressed, a character string "TRANSMIT" is displayed on the display unit 13 and the apparatus shifts to a transmission state (Step S78). Next, the first original is transmitted at the selected resolution and read density (refer to Steps S5 to S18) (Step S78), and a character string "TX P01" indicating the transmission of the first original is displayed on the display unit 13 (Step S80).

If a predetermined key input is not performed at Steps S71, S76, and S77 even after a predetermined time (e.g., 30 seconds) lapses, the apparatus shifts to a stand-by state.

After the first original is transmitted in the above manner, the operation advances to Step S81 of FIG. 11 whereat it is checked whether the resolution key 114 has been depressed. If not depressed, the operation advances to Step S87, whereas if depressed, an interrupt display start request (operation mode changing request) is issued and a current read resolution is displayed on the display unit 13 (Step S82). Specifically, if the current read resolution is set to the standard mode at Steps S5 to S11 (FIG. 3), the character string "STANDARD" is displayed on the display unit. Next, it is checked whether the resolution key 114 has been depressed to change the read resolution of the second and following originals (Step S83). If depressed (Yes), the contents of RAM 5 are renewed and the character string "FINE" is displayed on the display unit 13 (Step S84). In this manner, the read resolution for the second original is set to the fine mode. Next, at Step S85 it is checked whether a predetermined time T2 (e.g., 5 seconds) has lapsed after the resolution key 114 was depressed at Step S83. If lapsed, an interrupt display end request (changing request end) is issued and a character string "TX P01" is again displayed on the display unit 13 (Step S86). After the transmission completion of the first original is confirmed (Step S87), the second original in the fine mode is transmitted (Step S88) and a character string "TX P02" indicating that the second original is being transmitted is displayed on the display unit 13 (Step S89).

Next, the operation advances to Step S90 shown in FIG. 12 whereat it is checked whether the resolution key 114 has been depressed again while the second original is being transmitted (e.g., 2 to 3 seconds before the second original is transmitted completely). If depressed, the interrupt display start request is issued and the character string "FINE" indicating the current read resolution is displayed on the display unit 13 (Step S91). Next, at Step S92 it is checked whether the predetermined time T2 (e.g., 5 seconds) has lapsed after the resolution key 114 was depressed at Step S90. If not lapsed (No), the operation advances to Step S93 whereat it is checked whether the second original transmission is completed. Namely, if the judgement at Step S92 is negated (No), the second original is transmitted during the predetermined time T2. After the second original is transmitted completely, the operation advances to Step S94 at which the third original is transmitted at the same read resolution as the second original. In this manner, the third original is transmitted, and when the judgement at Step S92 becomes affirmative (Yes), i.e., when the predetermined time T2 lapses, the interrupt display end request is issued and a character string "TX P03" is displayed on the display unit 13 (Step S97). After the transmission completion of the third original is confirmed (Step S98), the apparatus shifts to a stand-by state (Step S99).

If the judgment at Step S90 is negated (No), the operation advances to Step S95 whereat it is checked whether the transmission of the second original is completed. If this judgement is negated (No), the operation returns to Step S90, whereas if this judgement is affirmative (Yes), the third original is transmitted and the character string "TX P03" is displayed on the display unit 13 (Step S97). After the transmission completion of the third original is confirmed (Step S98), the apparatus shifts to a stand-by state (S99).

As above, in the third embodiment, even if a plurality of originals are transmitted, it is possible to change the operation mode for each original and to confirm the operation mode such as a resolution during the transmission.

In the third embodiment, the resolution key 114 is depressed to change or confirm the resolution operation mode. Similarly, the read density operation mode can be changed or confirmed by depressing the density key 117.

Also in the third embodiment, if the stop key 120 is depressed under the condition that the resolution or density operation mode is displayed on the display unit 13 (e.g., at Step S13, S15, S17, S82, S84, or S91), then the operation state of the apparatus such as "TX P01" is displayed.

As described so far, according to the present invention, even if a small and inexpensive display unit on which an amount of information to be displayed at the same time is very small, is used, or even if a plurality of originals are collectively transmitted, confirmation, designation, changing and the like of the operation mode of the image processing apparatus can be made easily and rapidly.

What is claimed is:

1. A processing apparatus having a setting term whose setting value can be changed by an operator, said processing apparatus comprising:

operation means used by the operator to perform an input operation to change the setting value;

display means for displaying character information corresponding to the respective setting value in accordance with an input operation of said operation means;

storage means for storing the setting value; and control means for controlling said display means to display or not to display the the character information, wherein said control means is adapted to change the setting value stored in said storage means to a setting value entered from said operation means, in accordance with an input of changing the setting value entered from said operation means, when the character information is displayed, while said control means is adapted not to change the setting value stored in said storage means to a setting value entered from said operation means, in accordance with an input of changing the setting value entered from said operation means, when no character information is displayed.

2. A processing apparatus according to claim 1, wherein said control means changes the setting value stored in said storage means to a setting value entered through said operation means in accordance with the input of changing the setting value entered from said operation means, after the character information is displayed.

3. A processing apparatus according to claim 2, wherein said setting term has a plurality of setting values and one of the setting values can be selectively set.

4. A processing apparatus according to claim 1, wherein said processing apparatus has a plurality of setting terms, and wherein in accordance with an input of changing the setting value of another setting term entered from said operation means when the character information for one setting term is displayed, the character information for said one setting term displayed on said display means is changed to the character information for said another setting term, while the setting value for said another setting term stored in said storage means is not changed to a setting value entered from said operation means.

5. A processing apparatus according to claim 4, wherein said control means controls said display means to change the character information for said one setting term to the character information for said another setting term, and thereafter changes the setting value of said another setting term stored in said storage means to a setting value entered from said operation means in accordance with an input of changing the setting value of said another setting term entered from said operation means.

6. A processing apparatus according to claim 5, wherein each of the plurality of setting terms has a plurality of setting values and one of the setting values can be selectively set.

7. A processing apparatus according to claim 4, wherein each of the plurality of setting terms has a plurality of setting values and one of the setting values can be selectively set.

8. A processing apparatus according to claim 1, wherein said setting term has a plurality of setting values and one of the setting values can be selectively set.

9. A processing apparatus according to claim 1, wherein said setting term has a plurality of setting values and one of the setting values can be selectively set.

10. A processing apparatus according to claim 1, further comprising reading means for reading an original, wherein said setting term is used for setting a density of an original to be read with said reading means.

11. A processing apparatus according to claim 1, further comprising communication means for image transmitting/receiving an image, wherein said setting term is used for setting a resolution of the image to be transmitted or received by said communication means.

12. A processing apparatus according to claim 1, further comprising image communication means for transmitting/receiving an image and speech communication means for transmitting/receiving a speech, wherein said setting term is used for setting one of an exclusive image communication mode for operating only said image communication means, an exclusive speech communication mode for operating only said speech communication means, and a changing mode for connecting either said communication means or said speech communication to a line.

13. A processing apparatus according to claim 12, wherein the switching mode includes an image communication priority mode for connecting said image communication means to the line with a priority over said speech communication means and a speech communication priority mode for connecting said speech communication means to the line with a priority over said image communication means.

14. A processing apparatus according to claim 1, wherein said control means controls said display means not to display the change screen in accordance with no input of changing the setting value being entered from said operation means for a predetermined time while the change screen is displayed on said display means.

15. A processing apparatus according to claim 1, wherein the processing apparatus is an image communication apparatus.

16. A processing apparatus according to claim 15, wherein the image processing apparatus is a facsimile apparatus.

17. An image processing method of operating a processing apparatus having a setting term whose setting value can be changed by an operator, said processing method comprising:

an operating step of operating an operation means used by the operator to perform an input operation to change the setting value;

a display step of displaying on a display means character information corresponding to the respective setting value in accordance with an input operation of said operation means;

a storage step of storing in a storage means the setting value; and a control step of controlling by a control means to control said display means to display or not to display the character information, wherein said control means is adapted to change the setting value stored in said storage means to a setting value entered from said operation means, in accordance with an input of changing the setting value entered from said operation means, when the character information is displayed, while said control means is adapted not to change the setting value stored in said storage means to a setting value entered from said operation means, in accordance with an input of changing the setting value entered from said operation means, when no character information is displayed.

18. A processing method according to claim 17,
wherein said control means changes the setting value stored in said storage means to a setting value entered through said operation means in accordance with the input of changing the setting value entered from said operation means, after the character information is displayed.

19. A processing method according to claim 17,
wherein said processing apparatus has a plurality of setting terms, and wherein in accordance with an input of changing the setting value of another setting term entered from said operation means when the character information for one setting term is displayed, the character information for said one setting term displayed on said display means is changed to the character information for said another setting term, while the setting value for said another setting term stored in said storage means is not changed to a setting value entered from said operation means.

20. A processing method according to claim 19,
wherein said control means controls said display means to change the character information for said one setting term to the character information for said another setting term, and thereafter changes the setting value of said another setting term stored in said storage means to a setting value entered from said operation means in accordance with an input of changing the setting value of said another setting term entered from said operation means.

21. A computer readable medium having recorded thereon codes for implementing a computer implementable method of processing using a processing apparatus having a setting term whose setting value can be changed by an operator, said processing method comprising:
an operating step of operating an operation means used by the operator to perform an input operation to change the setting value;
a display step of displaying on a display means character information corresponding to the respective setting value in accordance with an input operation of said operation means;
a storage step of storing in a storage means the setting value; and
a control step of controlling by a control means to control said display means to display or not to display the character information, wherein said control means is adapted to change the setting value stored in said storage means to a setting value entered from said operation means, in accordance with an input of changing the setting value entered from said operation means, when the character information is displayed, while said control means is adapted not to change the setting value stored in said storage means to a setting value entered from said operation means, in accordance with an input of changing the setting value entered from said operation means, when no character information is displayed.

22. A computer readable medium according to claim 21,
wherein said control means changes the setting value stored in said storage means to a setting value entered through said operation means in accordance with the input of changing the setting value entered from said operation means, after the character information is displayed.

23. A computer readable medium according to claim 21,
wherein said processing apparatus has a plurality of setting terms, and wherein in accordance with an input of changing the setting value of another setting term entered from said operation means when the character information for one setting term is displayed, the character information for said one setting term displayed on said display means is changed to the character information for said another setting term, while the setting value for said another setting term stored in said storage means is not changed to a setting value entered from said operation means.

24. A computer readable medium according to claim 23,
wherein said control means controls said display means to change the character information for said one setting term to the character information for said another setting term, and thereafter changes the setting value of said another setting term stored in said storage means to a setting value entered from said operation means in accordance with an input of changing the setting value of said another setting term entered from said operation means.

25. A computer program product embodying a program for implementing a processing method of operating a processing apparatus having a setting term whose a setting value can be changed by an operator, said program comprising:
program code for an operating step of operating an operation means used by the operator to perform an input operation to change the setting value;
program code for a display step of displaying on a display means character information corresponding to the respective setting value in accordance with an input operation of said operation means;
program code for a storage step of storing in a storage means the setting value; and
program code for a control step of controlling by a control means to control said display means to display or not to display the character information, wherein said control means is adapted to change the setting value stored in said storage means to a setting value entered from said operation means, in accordance with an input of changing the setting value entered from said operation means, when the character information is displayed, while said control means is adapted not to change the setting value stored in said storage means to a setting value entered from said operation means, in accordance with an input of changing the setting value entered from said operation means, when no character information is displayed.

26. A computer program product according to claim 25,
wherein said control means changes the setting value stored in said storage means to a setting value entered through said operation means in accordance with the input of changing the setting value entered from said operation means, after the character information is displayed.

27. A program product according to claim 25,
wherein said processing apparatus has a plurality of setting terms, and wherein in accordance with an input of changing the setting value of another setting term entered from said operation means when the character information for one setting term is displayed, the character information for said one setting term displayed on said display means is changed to the character information for said another setting term, while the setting value for said another setting term stored in said storage means is not changed to a setting value entered from said operation means.

28. A program product according to claim 27, wherein said control means controls said display means to change the character information for said one setting term to the character information for said another setting term, and thereafter changes the setting value of said another setting term stored in said storage means to a setting value entered from said operation means in accordance with an input of changing the setting value of said another setting term entered from said operation means.

\* \* \* \* \*

UNITED STATES PATENT AND TRADEMARK OFFICE
CERTIFICATE OF CORRECTION

PATENT NO.    : 6,295,071 B1
DATED         : September 25, 2001
INVENTOR(S)   : Makoto Mikuni et al.

It is certified that error appears in the above-identified patent and that said Letters Patent is hereby corrected as shown below:

Title page,
Item [57], ABSTRACT, line 1, "has" should read -- that has --.

Column 1,
Line 45, "user" should read -- user who --.

Column 2,
Line 47, "embdoiment" should read -- embodiment --.

Column 9,
Line 18, "the the" should read -- the --.

Signed and Sealed this

Thirtieth Day of April, 2002

Attest:

Attesting Officer

JAMES E. ROGAN
*Director of the United States Patent and Trademark Office*